Jan. 19, 1960 J. B. GODSHALK ET AL 2,922,104
APPARATUS FOR TESTING MULTI-CELL STORAGE BATTERIES
Filed June 25, 1958
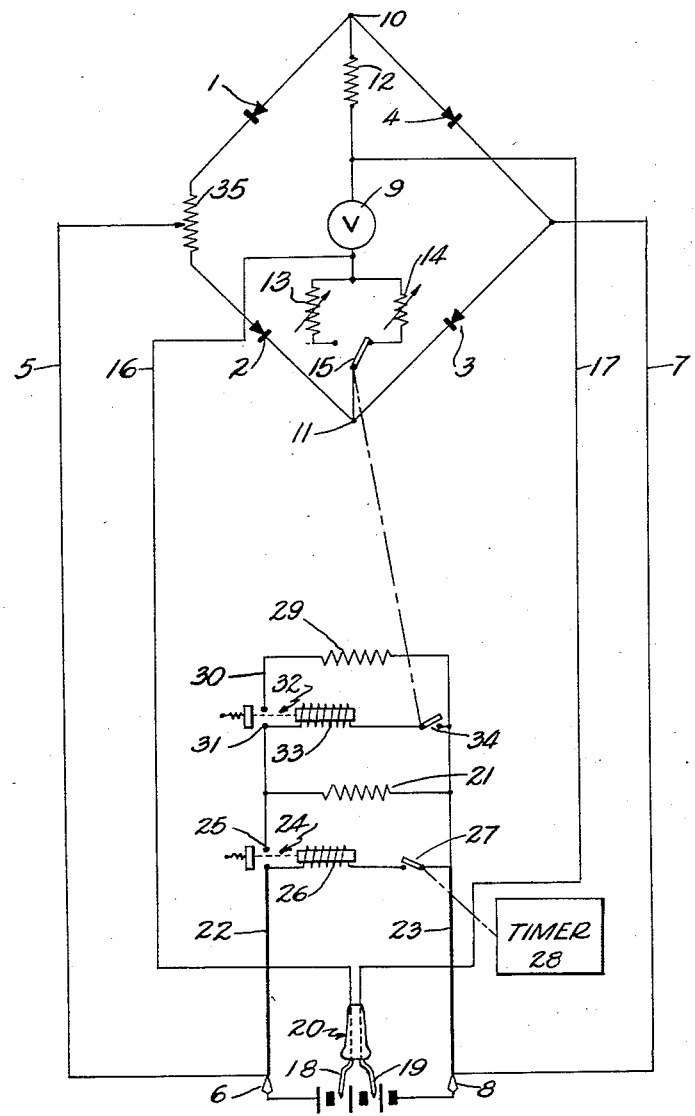
INVENTORS
JAMES B. GODSHALK
LEWIS A. MEDLAR
BY D.C. Roylance
ATTORNEY

2,922,104

APPARATUS FOR TESTING MULTI-CELL STORAGE BATTERIES

James B. Godshalk, West Pikeland Township, Chester County, and Lewis A. Medlar, Oreland, Pa., assignors to Fox Products Company, Philadelphia, Pa., a corporation of Pennsylvania Application June 25, 1958, Serial No. 744,436

5 Claims. (Cl. 324—29.5)

This invention relates to battery testers and particularly to a novel and improved multi-function tester for multi-cell storage batteries.

Various types of apparatus have heretofore been proposed for testing storage batteries in accordance with several test procedures, including determination of the open-circuit terminal voltage of the battery, the terminal voltage when the battery is under load, and the voltage of the individual cells of the battery. In recent years, the trade has come to accept the determination of cell voltages as a satisfactory test procedure, and cell voltage testers are widely used in service stations, garages and the like. However, the newer types of automotive storage batteries, and particularly the 12-volt batteries, are so constructed that it is frequently difficult, if not impossible, to connect a tester to the cell connector straps. Accordingly, there has been a tendency to revert to overall or terminal voltage testing. Even so, there is frequently a need for both terminal voltage testing and cell voltage testing, particularly in cases, such as service stations, where the user encounters a wide variety of batteries from various manufacturers.

An object of the invention is to provide an improved multi-purpose battery tester capable of carrying out determinations of open circuit terminal voltage, terminal voltage on load, and cell voltage, for batteries of widely varying configurations, without requiring the operator to have unusual skill.

Another object is to devise an improved tester employing a single voltage responsive device for determining either the terminal voltage of the battery, or the voltage of a single cell thereof, as desired.

A further object is to provide a tester including voltage responsive means connectable to the battery terminals by suitable connectors, the construction being such that the operator need give no attention to battery polarity.

Yet another object is to devise a tester comprising a single voltage responsive device, first circuit means connectable to the battery terminals to employ the voltage responsive device for a terminal voltage test, and second circuit means connectable to a single cell of the battery to employ the voltage responsive device to test such cell, the arrangement being such that the second circuit means can be employed even though the first circuit means is connected to the terminals of the battery under test.

In order that the manner in which these and other objects are attained in accordance with the invention can be readily understood, reference is had to the accompanying drawings, which form a part of this specification, and wherein:

Fig. 1 is a schematic diagram of one advantageous embodiment of the invention.

Broadly, testers constructed in accordance with the invention comprise a voltage responsive device, such as a voltmeter, a first circuit for connecting such device across the terminals of the battery through a rectifier so connected as to allow the apparatus to function regardless of the polarity of the battery, and a second circuit, including a connector such as a twin-pronged hand prod, via which the voltage responsive device is connected directly across a single cell of the battery, such connection of the second circuit means affording means for preventing current flow in the first circuit from affecting the voltage responsive device. In addition, the tester includes load circuit means for discharging the battery at a desired rate, and selectively operable means for conditioning the apparatus for testing a battery of one of a plurality of different voltage ratings.

Turning now to the drawings in detail, it will be seen that the embodiment of the invention here illustrated comprises a bridge-connected rectifier including unidirectoinal conductive devices 1–4, the junction between devices 1 and 2, forming one input terminal for the bridge, being connected via conductor 5 to terminal connector clamp 6 and the junction between devices 3 and 4, forming the other input terminal, being connected via conductor 7 to a second terminal connector clamp 8. A voltmeter 9, advantageously of the suppressed zero type, is connected between the output terminals 10, 11 of the bridge. Between voltmeter 9 and point 10 there is connected a single resistance 12. Between voltmeter 9 and point 11 there are provided two parallel resistances 13, 14, both adjustable and selectively connectable in series with the voltmeter by means of a manual selector switch 15.

In order that voltmeter 9 can be connected to a single cell of the battery, independently of the circuit just described, the terminals of the voltmeter are connected, via conductors 16, 17, to the two prongs 18, 19, respectively, of a hand prod 20.

The load circuit provided to discharge the battery under test comprises a first discharge resistance 21 connected across the battery to be tested via conductors 22, 23 connected respectively to clamps 6, 8. A relay 24 has its normally open contacts 25 connected in conductor 22 in series with resistance 21, the actuating winding 26 of the relay being connected between conductors 22, 23 via normally open switch 27, the latter advantageously being actuated by a conventional timer indicated at 28. Also incluuded is a second discharge resistance 29 connected in parallel with resistance 21 by conductor 30 via normally open contacts 31 of a relay 32. Actuating winding 33 of relay 32 is connected in parallel with both discharge resistances, via switch 34.

The particular embodiment illustrated is intended for use with batteries having either of two different voltage ratings, for example, with 6-volt and 12-volt batteries. When a 6-volt battery is to be tested, both switches 27 and 34 are closed, so that the two discharge resistances 21, 29 are connected to the battery in parallel. When a 12-volt battery is to be tested, only switch 27 is closed, so that only discharge resistance 21 is connected to the battery. It will be noted that neither resistance can be connected to the battery until switch 27 is closed, energizing relay 24 to closed position. Similarly, resistance 29 cannot be connected to the battery until switch 34 is closed, energizing relay 32 to closed position.

In this embodiment, dealing with conventional 6-volt and 12-volt automotive storage batteries, the voltmeter 9 is so constructed as to require approximately two volts for full scale deflection, and is thus useful for direct connection to a battery cell via the prod 20. In order that the meter can also be connected for an overall battery voltage test, the combination of resistance 12 and one of resistances 13, 14, depending on whether the battery is a 6-volt or 12-volt battery, is used in series with the meter. Thus, switch 15 is actuated to select resistance 13 for testing a 6-volt battery and resistance 14 for a 12-volt battery. For simplicity of operation, switches 15 and 34 are ganged to a single manual operator in such fashion that switch 34 is closed, causing discharge resistance 29 to be connected in parallel with resistance 21, when switch 15 is in position to select resistance 13, switch 34 being opened when switch 15 is actuated to select resistance 14 for 12-volt battery testing. Resistances 13, 14 are adjustable to provide for calibration of the apparatus.

Voltmeter 9 is provided with two scales for terminal or overall voltage tests, one of which is read during testing of 6-volt batteries and the other of which is read during testing of 12-volt batteries. In addition, the meter dial carries a third scale suitably calibrated for use when the meter is connected directly across a single cell of the battery. In this connection, it will be understood that the voltage of the individual cells is substantially the same, regardless of the overall battery rating, in the case of conventional batteries.

With switch 15 actuated to select resistance 14, for 12-volt battery testing, and assuming that clamps 6, 8 are connected to the battery terminals but prod 20 is not employed, current flows from the battery through meter 9 via conductors 5, 7, resistances 12, 14 and either unidirectional conductive elements 1, 3 or 2, 4, depending upon the polarity with which the battery is connected to the tester. In either case, the direction of current flow through the meter is the same. A potentiometer 35 is employed so that the circuit can be adjusted to provide consistent indication on meter 9 regardless of the direction of current flow in the rectifier bridge, and thus regardless of the polarity with which the battery is connected.

For overall testing of a 6-volt battery, switch 15 is actuated to select resistance 13, and switch 34 is accordingly closed to provide the proper resistance if the battery under test is to be discharged. The active circuit remains otherwise the same as just described for overall testing of a 12-volt battery.

When the voltage of a single cell of the battery is to be determined, the operator simply connects the prongs 18, 19 of prod 20 across that cell, without disconnecting clamp 6, 8 from the battery terminals. Assuming the cell being tested is the center cell of a 3-cell battery, as illustrated, then each of the end cells of the battery is connected to a circuit portion of the apparatus, but no current from the end cells is allowed to affect the meter. Thus, there is a circuit completed via clamp 6, conductors 5, unidirectional conductive device 2, one of resistances 13, 14, conductor 16 and prong 18, and current from the corresponding end cell. Similarly, there is a second circuit completed via prong 19, conductor 17, resistance 12, unidirectional conductive element 4, conductor 7 and clamp 8, for the other end cell. With prod 20 properly connected across the cell as shown, meter 9 is effectively isolated from current flowing in both of the circuits just identified.

We claim:

1. In an apparatus for testing multi-cell storage batteries, the combination of a first testing circuit adapted to be connected across the entire battery to be tested, said first testing circuit including an electrical indicating device, and a second testing circuit connected to said indicating device independently of said first circuit and including means for connecting said indicating device directly across a single cell of the battery to be tested, portions of said first and second testing circuits combining, when both testing circuits are thus connected to the battery, to form closed circuits via which current from cells other than said single cell can flow without affecting said indicating device, whereby said second testing circuit can be employed to make an individual cell test even though said first circuit is connected to the battery.

2. The apparatus of claim 1 and wherein said first testing circuit includes a bridge-connected rectifier having input terminals and output terminals, and leads for connecting said input terminals to the end terminals of the battery to be tested, said indicating device being connected across said output terminals, and said second testing circuit comprises a twin-pronged hand prod and leads connecting the prongs thereof each to a different side of said indicating device between said indicating device and the corresponding one of said output terminals.

3. In a device for testing multi-cell storage batteries, the combination of a first testing circuit comprising four unidirectional conductive devices, means connecting the same to form a bridge having input terminals and output terminals, two conductors each connected to a different one of said input terminals and each provided with connector means for connection to a terminal of the battery to be tested, a voltmeter having a first and a second terminal, a first resistance connected between said first terminal of said voltmeter and one of said output terminals, a second and a third resistance, and circuit means including a selector switch for selectively connecting either of said second and third resistances between said second terminal of said voltmeter and the other of said output terminals; and a second testing circuit comprising a twin-contact hand prod, one contact thereof being connected to a point between said first resistance and said first terminal of said voltmeter, the other contact thereof being connected to said circuit means between said second terminal of said voltmeter and said second and third resistances.

4. A device in accordance with claim 3 comprising load means for discharging the battery to be tested, and discharge circuit means for connecting said load means to the battery, said discharge circuit means comprising a manually actuatable load selector switch, said load selector switch being ganged with said resistance selector switch of said first testing circuit for simultaneous operation therewith.

5. In an apparatus for testing multi-cell storage batteries, the combination of a first testing circuit adapted to be connected across the entire battery to be tested and including a single voltmeter, and second circuit means for connecting the voltmeter across a single cell of the battery to be tested, said first testing circuit comprising first and second current limiting devices, a first lead and a second lead, said voltmeter being connected in series between said current limiting devices and said first and second leads being arranged to connect the series combination of said voltmeter and current limiting devices across the entire battery to be tested, said second testing circuit comprising a pair of connectors, a third lead and a fourth lead, said third lead connecting one of said connectors to a point between said voltmeter and said first current limiting device, said fourth lead connecting the other of said connectors to a point between said voltmeter and said second current limiting device, said first and third leads and first current limiting device, and said second and fourth lead and second current limiting device, combining to form closed circuits via which current from cells other than said single cell can flow without affecting said voltmeter, whereby said second testing circuit can be employed to make an individual cell test even though said first circuit is connected to the battery.

References Cited in the file of this patent
UNITED STATES PATENTS
2,076,639   Heyer _____ Apr. 13, 1937